(12) United States Patent
Du et al.

(10) Patent No.: US 9,716,707 B2
(45) Date of Patent: Jul. 25, 2017

(54) MUTUAL AUTHENTICATION WITH ANONYMITY

(71) Applicant: CHINA IWNCOMM CO., LTD., Xi'an, Shaanxi (CN)

(72) Inventors: Zhiqiang Du, Shaanxi (CN); Jun Cao, Shaanxi (CN); Manxia Tie, Shaanxi (CN); Yi Li, Shaanxi (CN)

(73) Assignee: CHINA IWNCOMM CO., LTD., Xi'An, Shaanxi (CN)

( * ) Notice: Subject to any disclaimer, the term of this patent is extended or adjusted under 35 U.S.C. 154(b) by 100 days.

(21) Appl. No.: 14/384,432

(22) PCT Filed: Mar. 12, 2013

(86) PCT No.: PCT/CN2013/072501
§ 371 (c)(1),
(2) Date: Sep. 11, 2014

(87) PCT Pub. No.: WO2013/135172
PCT Pub. Date: Sep. 19, 2013

(65) Prior Publication Data
US 2015/0135294 A1    May 14, 2015

(30) Foreign Application Priority Data

Mar. 12, 2012 (CN) .......................... 2012 1 0063055

(51) Int. Cl.
*H04L 9/32* (2006.01)
*H04L 29/06* (2006.01)
(Continued)

(52) U.S. Cl.
CPC .......... *H04L 63/0815* (2013.01); *G06F 21/33* (2013.01); *G06F 21/335* (2013.01);
(Continued)

(58) Field of Classification Search
CPC . H04L 63/0876; H04L 9/321; H04L 63/0869; H04L 63/0884; H04L 63/0407;
(Continued)

(56) References Cited

U.S. PATENT DOCUMENTS

| | | | |
|---|---|---|---|
| 5,491,750 | A | 2/1996 | Bellare et al. |
| 6,094,485 | A | 7/2000 | Weinstein et al. |

(Continued)

FOREIGN PATENT DOCUMENTS

| | | |
|---|---|---|
| CN | 1581183 A | 2/2005 |
| CN | 1630405 A | 6/2005 |

(Continued)

OTHER PUBLICATIONS

International Search Report for International Applicaiton No. PCT/CN2013/072501; Date of Mailing, Jun. 20, 2013.
(Continued)

*Primary Examiner* — Theodore C Parsons
(74) *Attorney, Agent, or Firm* — Cantor Colburn LLP (57) ABSTRACT

A method and device device for authentication are provided. The method includes: a second authenticator transmitting to a first authenticator a first identity authentication message; the first authenticator transmitting to an authentication server a second identity authentication message; the authentication server verifying the validity of a secure domain where the second authenticator is at and of the first authenticator on the basis of the second identity authentication message; the authentication server returning to the first authenticator a third identity authentication message; the first authenticator transmitting to the second authenticator a fourth identity authentication message; the second authenticator proceeding to verification when the fourth identity authentication message is received; the second authenticator transmitting to the first authenticator a fifth identity authen-
(Continued)

tication message; and the first authenticator proceeding when the fifth identity authentication message is received.

16 Claims, 2 Drawing Sheets

(51) Int. Cl.
*G06F 21/33* (2013.01)
*G06F 21/41* (2013.01)

(52) U.S. Cl.
CPC .............. *G06F 21/41* (2013.01); *H04L 9/321* (2013.01); *H04L 9/3213* (2013.01); *H04L 9/3247* (2013.01); *H04L 9/3263* (2013.01); *H04L 63/08* (2013.01); *H04L 63/0807* (2013.01); *H04L 63/0823* (2013.01); *H04L 63/0869* (2013.01); *H04L 63/0876* (2013.01); *H04L 63/0407* (2013.01); *H04L 63/0884* (2013.01)

(58) Field of Classification Search
CPC . H04L 63/0815; H04L 63/0421; H04L 63/08; H04L 63/0807; H04L 63/0823; H04L 9/3213; H04L 9/3263; G06F 21/41; G06F 21/33; G06F 21/335
See application file for complete search history.

(56) References Cited

U.S. PATENT DOCUMENTS

| | | | |
|---|---|---|---|
| 7,181,614 B1 | 2/2007 | Gehrmann et al. | |
| 7,418,596 B1 | 8/2008 | Carroll et al. | |
| 7,529,925 B2 | 5/2009 | Harkins | |
| 7,577,425 B2 | 8/2009 | Okazaki et al. | |
| 8,356,179 B2 | 1/2013 | Tie et al. | |
| 8,392,710 B2* | 3/2013 | Tie | H04L 9/0844 713/155 |
| 8,413,256 B2 | 4/2013 | Gonzalez et al. | |
| 2002/0076042 A1 | 6/2002 | Sandhu et al. | |
| 2002/0197979 A1 | 12/2002 | Vanderveen et al. | |
| 2003/0028484 A1* | 2/2003 | Boylan | G06Q 20/02 705/40 |
| 2003/0195857 A1 | 10/2003 | Acquisti | |
| 2004/0059685 A1 | 3/2004 | Sakamura et al. | |
| 2004/0073814 A1 | 4/2004 | Miyazaki et al. | |
| 2004/0260926 A1 | 12/2004 | Arditti Modiano et al. | |
| 2005/0097316 A1 | 5/2005 | Kim | |
| 2005/0143065 A1 | 6/2005 | Pathan et al. | |
| 2005/0257260 A1 | 11/2005 | Lenoir et al. | |
| 2005/0283608 A1* | 12/2005 | Halcrow | G06Q 20/3674 713/175 |
| 2006/0135141 A1 | 6/2006 | Wilson et al. | |
| 2006/0274695 A1 | 12/2006 | Krishnamurthi et al. | |
| 2006/0281442 A1 | 12/2006 | Lee et al. | |
| 2007/0242830 A1 | 10/2007 | Conrado et al. | |
| 2008/0091941 A1 | 4/2008 | Yonezawa et al. | |
| 2008/0178005 A1 | 7/2008 | Gentry | |
| 2008/0184350 A1 | 7/2008 | Chu | |
| 2008/0222425 A1 | 9/2008 | Buss | |
| 2008/0270798 A1 | 10/2008 | Charles et al. | |
| 2009/0089575 A1 | 4/2009 | Yonezawa et al. | |
| 2009/0254750 A1 | 10/2009 | Bono et al. | |
| 2009/0276630 A1 | 11/2009 | Teranishi | |
| 2009/0310510 A1 | 12/2009 | Corrao et al. | |
| 2010/0306839 A1 | 12/2010 | Tie et al. | |
| 2011/0055556 A1 | 3/2011 | Choi et al. | |
| 2011/0078438 A1* | 3/2011 | Tie | H04L 9/0844 713/155 |
| 2011/0154045 A1 | 6/2011 | Lee et al. | |
| 2012/0072732 A1 | 3/2012 | Canard et al. | |
| 2012/0284518 A1 | 11/2012 | Walker et al. | |
| 2013/0227289 A1 | 8/2013 | Du et al. | |
| 2013/0232551 A1 | 9/2013 | Du et al. | |
| 2014/0230027 A1* | 8/2014 | Cha | H04L 63/0815 726/5 |

FOREIGN PATENT DOCUMENTS

| | | |
|---|---|---|
| CN | 1645393 A | 7/2005 |
| CN | 1668005 A | 9/2005 |
| CN | 10805341 A | 7/2006 |
| CN | 1835008 A | 9/2006 |
| CN | 1934823 A | 3/2007 |
| CN | 101136928 A | 3/2008 |
| CN | 101141711 A | 3/2008 |
| CN | 101145910 A | 3/2008 |
| CN | 101247223 A | 8/2008 |
| CN | 101286844 A | 10/2008 |
| CN | 101364876 A | 2/2009 |
| CN | 101374153 A | 2/2009 |
| CN | 101453476 A | 6/2009 |
| CN | 101599959 A | 12/2009 |
| CN | 101621374 A | 1/2010 |
| CN | 101635624 A | 1/2010 |
| CN | 101640593 A | 2/2010 |
| CN | 101645776 A | 2/2010 |
| CN | 101764742 A | 6/2010 |
| CN | 101888297 A | 11/2010 |
| CN | 101984577 A | 3/2011 |
| CN | 101997688 A | 3/2011 |
| EP | 2214429 A1 | 8/2010 |
| EP | 2257021 A1 | 12/2010 |
| EP | 2282444 A1 | 2/2011 |
| EP | 2639999 A1 | 9/2013 |
| JP | 63036634 A | 2/1988 |
| JP | 2001134181 A | 5/2001 |
| JP | 2003134109 A | 5/2003 |
| JP | 2003218954 A | 7/2003 |
| JP | 2003234740 A | 8/2003 |
| JP | 2004054905 A | 2/2004 |
| JP | 20070249379 A | 2/2007 |
| JP | 2008511223 A | 4/2008 |
| JP | 2009027708 A | 2/2009 |
| JP | 2009033740 A | 2/2009 |
| JP | 2013544052 A | 12/2013 |
| WO | 2006021236 A1 | 3/2006 |
| WO | 2006099540 A2 | 9/2006 |
| WO | 2007030213 A2 | 3/2007 |

OTHER PUBLICATIONS

Extended European Search Report corresponding to Application No. 13761320.4-1870/2827540, PCT/CN2013/072501; Date of Mailing: Feb. 11, 2015.
A Studyon Authentication Mechanism of WWW System Using IC Cards, Toshiaki Tanaka, Satoshi Hada and Mitsunu Yamada KDD R&D Labs, pp. 3-363 to 3-364 (English Summary).
"Survey on 'Status of Identity Authentication Technologies,'" Security Center of Information Technology Promotion Agency, japan, Mar. 2003, pp. 13-19 and an English translation.
"The Progress of Tri-Element Peer Authentication (TePA) and Access Control Method", Tracks for Standard & Technology, Jun. 2009, http.//www.its.cesi.cn), p. 21-23.
A. Menezes et al., "Handbook of Applied Cryptography" CRC Press, Inc. 1996, pp. 489-541.
Schneier, Bruce "Applied Ciyptography 2nd Edition: Protocols, algorithms, and source code in C," 1996, pp. 59-60.
Kato, T. et al., "Development of Anonymous Authentication System for Personal Data Protection," pp. 569-574 (English abstract).
Chinese 2nd Office Action corresponding to Applicaton No. 201210063055.8; Issued: Aug. 11, 2016 with English translation.
Jianjun Li et al., "Introduction to Electronic Commerce" Harbin Institute of Technology Press, Harbin, Jul. 2011, paragraph 2, p. 162; with English explanation of relevance.
Qiansheng Fu, "E-commerce Tutorial" National Defense Industry Press, Beijing, Jun. 2011, second to the last paragraph, p. 262, with English explanation of relevance.

(56) References Cited

OTHER PUBLICATIONS

Korean First Office Action corresponding to Application No. 10-2014-7028097; Filing Date: Dec. 30, 2015, with English Translation.

Extended European Search Report corresponding to Application No. 13760861.8-1870/2827528 PCT/CN2013/072494; Date of Mailing: Sep. 9, 2015.

Extended European Search Report corresponding to Application No. 13760861.8-1870/2827528, PCT/CN2013/072494; Date of Mailing: Apr. 14, 2015.

Extended European Search Report corresponding to Application No. 13760980.6-1870/2827529, PCT/CN2013072497, Date of Mailing: Mar. 25, 2015.

Housley et al.; RFC 3280—Internet X.509 Public Key Infrastructure Certificate and Certificate Revocation List (CRL) Profile; 2002; Retreived from the Internet <URL:left.org/rfc/rfc3280.txt.pdf>; pp. 1-129 as printed.

International Search Report for International Application No. PCT/CN2013/072497; Date of Mailing, Jun. 20, 2013; with English Translation.

International Search Report for International Application No. PCT/CN2013/072494; Date of Mailing, Jun. 13, 2013 with English Translation.

Japanese First Office Action corresponding to Application No. 2014-561277; Issue Date: Nov. 4, 2015, with English translation.

US Final Office Action corresponding to U.S. Appl. No. 14/384,425; Date of Mailing: Jun. 10, 2016.

US Non-Final Office Action corresponding to U.S. Appl. No. 14/384,425; Date of Mailing: Sep. 11, 2014.

US Non-Final Office Action corresponding to U.S. Appl. No. 14/384,445; Date of Mailing: Sep. 11, 2015.

Japanese First Office Action corresponding to Application No. 2014-561278; Issue Date: Nov. 4, 2015, with English translation.

Extended European Search Report corresponding to Application No. 09753496.0-1870/2282444 PCT/CN2009/072023; Issued: Oct. 26, 2016.

\* cited by examiner

MUTUAL AUTHENTICATION WITH ANONYMITY

This application is a National Stage application of PCT international application PCT/CN2013/072501, filed on Mar. 12, 2013 which claims the priority to Chinese Patent Application No. 201210063055.8, entitled "METHOD AND SYSTEM FOR AUTHENTICATION", filed with the Chinese Patent Office on Mar. 12, 2012, which is incorporated by reference in its entirety herein.

FIELD OF THE TECHNOLOGY

The present application relates to the field of authentication, and particularly to a method, a device and a system for authentication.

BACKGROUND

Nowadays, people pay more and more attention to their privacy protection. In many occasions when authentication of a resident identity is required, people do not want to expose their identity information to other people in verification of legitimacy of their identities, so as to fully protect their privacy. For example, when voting on sensitive events, voters want to vote with legal identities without exposure of their identities. In some occasions of consumption, consumers want to pay without exposing their personal information to a merchant. In a case that network users log in a network with controllable identities, they do not want their identity information to be revealed to the public. Currently, demands on these kinds of privacy production keep growing.

There are several techniques for an identity authentication service. At present, an identity authentication method based on public key cryptography is commonly used. By this method, verification of legitimacy of an identity of one to be authenticated is accomplished with digital signature, and at the same time, identity information of the one to be authenticated is exposed to an authenticator. Apparently, there are obvious limitations in this kind of technology during provision of authentication service in the above occasions of application, because privacy of a user can not be protected. In addition, an identity authentication technology with privacy production is required to provide capability of traceability for convenience of control by a controller when necessary.

SUMMARY

A method, a device and a system for authentication are provided in this application to solve the problems that privacy can not be protected by identity authentication technology mentioned in the background and capability of traceability is required in the authentication technology with privacy protection.

Technical solutions of the application are as follows. An authentication method is provided in the application, including steps 1 to 8.

Step 1 includes: transmitting a first identity authentication message to a first authenticator by a second authenticator, where the message includes an identification of a security domain that the second authenticator belongs to.

Step 2 includes: transmitting a second identity authentication message to an authentication server by the first authenticator, where the second identity authentication message includes the identification of the security domain that the second authenticator belongs to and an identification of the first authenticator.

Step 3 includes: verifying, by the authentication server, legitimacy of the security domain that the second authenticator belongs to and legitimacy of the first authenticator according to the second identity authentication message, and generating a verification result of the security domain that the second authenticator belongs to and a verification result of the first authenticator, after the authentication server receives the second identity authentication message.

Step 4 includes: returning a third identity authentication message to the first authenticator by the authentication server, where the third identity authentication message includes the verification result of the security domain that the second authenticator belongs to, the verification result of the first authenticator, and identity authentication information of the authentication server for information including the verification result of the security domain that the second authenticator belongs to and the verification result of the first authenticator.

Step 5 includes: transmitting a fourth identity authentication message to the second authenticator by the first authenticator after the first authenticator receives the third identity authentication message, where the fourth identity authentication message includes the identification of the first authenticator, the verification result of the first authenticator obtained by verifying the first authenticator by the authentication server, the identity authentication information of the authentication server, and identity authentication information of the first authenticator for information including the identifier of the security domain that the second authenticator belongs to.

Step 6 includes: performing, by the second authenticator, verification on the fourth identity authentication message and determining, by the second authenticator, legitimacy of identity of the first authenticator according to the verification, after the second authenticator receives the fourth identity authentication message.

Step 7 includes: transmitting a fifth identity authentication message to the first authenticator by the second authenticator, where the fifth identity authentication message includes identity authentication information of the second authenticator for information including the identifier of the first authenticator and the identifier of the security domain that the second authenticator belongs to.

Step 8 includes: verifying, by the first authenticator, legitimacy of the security domain that the second authenticator belongs to after the first authenticator receives the fifth identity authentication message.

A first authentication device is further provided in embodiments of the application, including:

a receiving unit, a transmitting unit, and a verifying unit.

The receiving unit is configured to receive a first identity authentication message sent by a second authentication device, where the first identity authentication message includes an identification of a security domain that the second authentication device belongs to.

The transmitting unit is configured to transmit a second identity authentication message to an authentication server, where the second identity authentication message includes the identification of the security domain that the second authentication device belongs to and an identification of the first authentication device.

The receiving unit is further configured to receive a third identity authentication message returned by the authentication server, where the third identity authentication message includes a verification result of the security domain that the second authentication device belongs to, a verification result of the first authentication device, and identity authentication information of the authentication server for information including the verification result of the security domain that the second authentication device belongs to and the verification result of the first authentication device.

The transmitting unit is further configured to transmit a fourth identity authentication message to the second authentication device, where the fourth identity authentication message includes the identification of the first authentication device, the verification result of the first authentication device obtained by verifying the first authentication device by the authentication server, the identity authentication information of the authentication server, and identity authentication information of the first authentication device for information including the identifier of the security domain that the second authentication device belongs to.

The receiving unit is further configured to receive a fifth identity authentication message sent by the second authentication device, where the fifth identity authentication message includes identity authentication information of the second authentication device for information including the identifier of the first authentication device and the identifier of the security domain that the second authentication device belongs to.

The verification unit is configured to verify legitimacy of the security domain that the second authentication device belongs to after receiving the fifth identity authentication message.

A second authentication device is further provided in embodiments of the application, including:

a transmitting unit, a receiving unit, and a verification unit.

The transmitting unit is configured to transmit a first identity authentication message to a first authentication device, where the first identity authentication message includes an identification of a security domain that the second authentication device belongs to.

The receiving unit is configured to receive a fourth identity authentication message sent by the first authentication device, where the fourth identity authentication message includes the identification of the first authentication device, a verification result of the first authentication device obtained by verifying the first authentication device by the authentication server, identity authentication information of the authentication server, and identity authentication information of the first authentication device for information including the identifier of the security domain that the second authentication device belongs to.

The verification unit is configured to perform verification on the fourth identity authentication message and determine legitimacy of identity of the first authentication device according to the verification, after receiving the fourth identity authentication message.

The transmitting unit is further configured to transmit a fifth identity authentication message to the first authentication device, where the fifth identity authentication message includes identity authentication information of the second authentication device for information including the identifier of the first authentication device and the identifier of the security domain that the second authentication device belongs to.

An authentication server is further provided in embodiments of the application, including:

a receiving unit, a verification unit, and a transmitting unit.

The receiving unit is configured to receive a second identity authentication message sent by a first authentication device, where the second identity authentication message includes an identification of a security domain that a second authentication device belongs to and an identification of the first authentication device.

The verification unit is configured to verify legitimacy of the security domain that the second authentication device belongs to and legitimacy of the first authentication device according to the second identity authentication message, and generate a verification result of the security domain that the second authentication device belongs to and a verification result of the first authentication device.

The transmitting unit is configured to return a third identity authentication message to the first authentication device, where the third identity authentication message includes the verification result of the security domain that the second authentication device belongs to, the verification result of the first authentication device, and identity authentication information of the authentication server for information including the verification result of the security domain that the second authentication device belongs to and the verification result of the first authentication device.

An authentication system is further provided in the application. The authentication system performs the authentication method of claim 1. The authentication system includes a first authentication device, a second authentication device, a security domain that the second authentication device belongs to, and an authentication server. During identification authentication between the first authentication device and the second authentication device, the second authentication device exchanges information with only the first authentication device, and the authentication server exchanges information with only the first authentication device.

An advantage of embodiments of the application includes: authentication being accomplished under a condition that a second authenticator is anonymous during the authentication, and privacy of the second authenticator is protected while the second authenticator is authenticated.

BRIEF DESCRIPTION OF THE DRAWINGS

Drawings described herein are provided for further understanding of the application. The Drawings are a part of the application, and are not limitations to the application.

DETAILED DESCRIPTION OF THE EMBODIMENTS

For clarity of the purpose, the technical solutions and the advantage of this application, the application is further described in detail in combination with embodiments and drawings. The illustrative embodiments and the description thereof are used to explain the application, but should not be construed as limitations to the application.

The system in the application includes a first authentication device, a second authentication device, a security domain that the second authentication device belongs to, and an authentication server. Either of the first authentication device and the second authentication device may be an authentication device for the other one. The first authentication device has its own public authentication information and private authentication information. The private authentication information is used to generate identity authentication information for other authentication devices to authenticate the first authentication device, and the public authentication information discloses to external the identity authentication information for other authentication devices to verify the first authentication device. The first authentication device has an identification, where the identification may be an identifier of the first authentication device or may be identity certification information of the first authentication device. The security domain is a logic division with a boundary and entities within the boundary share a piece of public authentication information. Each entity in the security domain has its own private authentication information used to generate identity authentication information for other authentication devices to authenticate the entity. Public authentication information of the security domain is disclosed to external for other authentication devices to verify the identity authentication information of the entity. The security domain has an identification and the identification may be an identifier of the security domain or identity certification information of the security domain. The authentication server is configured to provide authentication services from a trusted third party to an authentication device, to help the authentication device accomplish identification authentication of a device to be authenticated. The authentication server has private authentication information and corresponding public authentication information. The public authentication information is open to other entities to verify identity authentication information generated by using private authentication information by the authentication server. During implementing identity authentication between the first authentication device and the second authentication device by the system in the application, the second authentication device exchanges information only with the first authentication device (referring to the method for identity authentication provided in the application for details of the information exchange), and the authentication server exchanges information only with the first authentication device (referring to the method for identity authentication provided in the application for details of the information exchange).

A method for identity authentication is provided in the application, including steps 1 to 8.

Step 1 includes: transmitting a first identity authentication message to a first authenticator by a second authenticator, where the first identity authentication message includes an identification of a security domain that the second authenticator belongs to.

Step 2 includes: transmitting a second identity authentication message to an authentication server by the first authenticator, where the second identity authentication message includes the identification of the security domain that the second authenticator belongs to and an identification of the first authenticator.

Step 3 includes: verifying, by the authentication server, legitimacy of the security domain that the second authenticator belongs to and legitimacy of the first authenticator according to the second identity authentication message, and generating a verification result of the security domain that the second authenticator belongs to and a verification result of the first authenticator, after the authentication server receives the second identity authentication message.

Step 4 includes: returning a third identity authentication message to the first authenticator by the authentication server, where the third identity authentication message includes the verification result of the security domain that the second authenticator belongs to, the verification result of the first authenticator, and identity authentication information of the authentication server for these two verification results (Note: for the identity authentication information of the authentication server for these two verification results, the two verification results may be included in one piece of the identity authentication information of the authentication server, or the verification result of the security domain that the second authenticator belongs to may be included in one piece of the identity authentication information of the authentication server and the verification result of the first authenticator may be included in another piece of the identity authentication information of the authentication server).

Step 5 includes: transmitting a fourth identity authentication message to the second authenticator by the first authenticator after the first authenticator receives the third identity authentication message, where the fourth identity authentication message includes the identification of the first authenticator, the verification result of the first authenticator obtained by verifying the first authenticator by the authentication server, the identity authentication information of the authentication server, and identity authentication information of the first authenticator for information including the identifier of the security domain that the second authenticator belongs to.

Step 6 includes: performing, by the second authenticator, verification on the fourth identity authentication message and determining, by the second authenticator, legitimacy of identity of the first authenticator according to the verification, after the second authenticator receives the fourth identity authentication message.

Step 7 includes: transmitting a fifth identity authentication message to the first authenticator by the second authenticator, where the fifth identity authentication message includes identity authentication information of the second authenticator for information including the identifier of the first authenticator and the identifier of the security domain that the second authenticator belongs to.

Step 8 includes: verifying, by the first authenticator, legitimacy of the security domain that the second authenticator belongs to after the first authenticator receives the fifth identity authentication message.

In other embodiments, the first identity authentication message may further include a second time-varying parameter (the time-varying parameter may be a time stamp, a sequence number or a random number) generated by the second authenticator. The second identity authentication message includes the second time-varying parameter and a third time-varying parameter, and the third time-varying parameter is generated by the first authenticator. The identity authentication information of the authentication server for information including the verification result of the security domain that the second authenticator belongs to in the third identity authentication message includes the third time-varying parameter, and the identity authentication information of the authentication server for information including the verification result of the first authenticator in the third identity authentication message includes the second time-varying parameter. The fourth identity authentication message further includes a first time-varying parameter generated by the first authenticator, and the identity authentication information of the first authenticator further includes the first time-varying parameter and the second time-varying parameter. The fifth identity authentication message includes the first time-varying parameter and the second time-varying parameter.

In particular, there are the following two ways for the authentication server to verify legitimacy of the security domain that the second authenticator belongs to according to the second identity authentication message in the above step 3.

In the first way, in a case that the identification of the security domain that the second authenticator belongs to in the second identity authentication message is an identifier of the security domain that the second authenticator belongs to, the authentication server searches for public authentication information of the security domain that the second authenticator belongs to, determines that the security domain that the second authenticator belongs to is legal if the public authentication information is found, and determines that the security domain that the second authenticator belongs to is illegal if the public authentication information is not found.

In the second way, in a case that the identification of the security domain that the second authenticator belongs to in the second identity authentication message is identity certification information of the security domain that the second authenticator belongs to, the authentication server verifies validity of the identity certification information, determines that the security domain that the second authenticator belongs to is legal if the identity certification information is valid, and determines that the security domain that the second authenticator belongs to is illegal if the identity certification information is invalid.

There are the following two ways for the authentication server to verify legitimacy of the first authenticator according to the second identity authentication message in the above step 3.

In the first way, in a case that the identification of the first authenticator in the second identity authentication message is an identifier of the first authenticator, the authentication server searches for public authentication information of the first authenticator, determines that the first authenticator is legal if the public authentication information is found, and determines that the first authenticator is illegal if the public authentication information is not found.

In the second way, in a case that the identification of the first authenticator in the second identity authentication message is identity certification information of the first authenticator, the authentication server verifies validity of the identity certification information, determines that the first authenticator is legal if the identity certification information is valid, and determines that the first authenticator is illegal if the identity certification information is invalid.

An implementation of performing verification on the fourth identity authentication message and determining legitimacy of the first authenticator according to the verification by the second authenticator in the above step 6 may include following steps 1) to 3).

In step 1), the second authenticator verifies validity of the identity authentication information of the authentication server; checks, in a case that the identity authentication information of the authentication server includes the second time-varying parameter, whether the second time-varying parameter generated by the second authenticator in the first identity authentication message is consistent with the second time-varying parameter included in the identity authentication information of the authentication server; and if the identity authentication information of the authentication server is valid and the second time-varying parameter generated by the second authenticator in the first identity authentication message is consistent with the second time-varying parameter included in the identity authentication information of the authentication server, performs step 2), otherwise determines the first authenticator is illegal.

In step 2), if the second authenticator determines that the first authenticator is legal and valid according to the verification result of the first authenticator obtained by verifying the first authenticator by the authenticator server, the second authenticator performs step 3), otherwise determines that the first authenticator is illegal.

In step 3), the second authenticator acquires public authentication information of the first authenticator, and verifies whether the identity authentication information of the first authenticator is valid according to the public authentication information; checks whether the identifier of the security domain that the second authenticator belongs to is consistent with the identifier of the security domain that the second authenticator belongs to included in the identity authentication information of the first authenticator; checks, in a case that the identity authentication information of the first authenticator includes the second time-varying parameter, whether the second time-varying parameter generated by the second authenticator in the first identity authentication message is consistent with the second time-varying parameter included in the identity authentication information of the first authenticator; and if the identity authentication information of the first authenticator is valid, the identifier of the security domain that the second authenticator belongs to is consistent with the identifier of the security domain that the second authenticator belongs to included in the identity authentication information of the first authenticator, and the second time-varying parameter generated by the second authenticator in the first identity authentication message is consistent with the second time-varying parameter included in the identity authentication information of the first authenticator, determines that the first authenticator is legal, otherwise determines that the first authenticator is illegal.

There are the following two ways for implementation of verifying legitimacy of the security domain that the second authenticator belongs to by the first authenticator after the first authenticator receives the fifth identity authentication message in the above step 8.

The first way includes following steps 1) to 3).

In step 1), the first authenticator verifies whether the identity authentication information of the authentication server for information including the verification result of the security domain that the second authenticator belongs to is valid; checks, in a case that the identity authentication information of the authentication server includes the third time-varying parameter, whether the third time-varying parameter generated by the first authenticator in the second identity authentication message is consistent with the third time-varying parameter included in the identity authentication information of the authentication server; and if the third time-varying parameter generated by the first authenticator in the second identity authentication message is consistent with the third time-varying parameter included in the identity authentication information of the authentication server, performs step 2), otherwise determines that the second authenticator is illegal.

In step 2), if the first authenticator determines that the second authenticator is legal and valid according to the verification result of the second authenticator obtained by verifying the second authenticator by the authenticator server, the first authenticator performs step 3), otherwise determines that the second authenticator is illegal.

In step 3), the first authenticator acquires public authentication information of the security domain that the second authenticator belongs to, and verifies whether the identity authentication information of the second authenticator is valid according to the public authentication information; checks whether the identifier of the first authenticator is consistent with the identifier of the first authenticator included in the identity authentication information of the second authenticator; checks, in a case that the fifth identity authentication message includes the first time-varying parameter, whether the first time-varying parameter in the fourth identity authentication message is consistent with the first time-varying parameter included in the identity authentication information of the second authenticator; and if the identity authentication information of the second authenticator is valid, the identifier of the first authenticator is consistent with the identifier of the first authenticator included in the identity authentication information of the second authenticator, and the first time-varying parameter in the fourth identity authentication message is consistent with the first time-varying parameter included in the identity authentication information of the second authenticator, determines that the second authenticator is legal, otherwise determines that the first authenticator is illegal.

In the second way, before the first authenticator transmits the fourth identity authentication message to the second authenticator, the first authenticator verifies whether the identity authentication information of the authentication server for information including the verification result of the security domain that the second authenticator belongs to is valid, and checks, in a case that the identity authentication information of the authentication server includes the third time-varying parameter, whether the third time-varying parameter generated by the first authenticator in the second identity authentication message is consistent with the third time-varying parameter included in the identity authentication information of the authentication server. The first authenticator transmits the fourth identity authentication message to the second authenticator if the identity authentication information of the authentication server for information including the verification result of the security domain that the second authenticator belongs to is valid and the third time-varying parameter generated by the first authenticator in the second identity authentication message is consistent with the third time-varying parameter included in the identity authentication information of the authentication server.

Accordingly, verifying legitimacy of the security domain that the second authenticator belongs to by the first authenticator according to the fifth identity authentication message includes following step 1) and step 2).

In step 1), if the first authenticator determines that the security domain that the second authenticator belongs to is legal and valid according to the verification result of the security domain that the second authenticator belongs to obtained by verifying the security domain by the authenticator server, the first authenticator performs step 2), otherwise determines that the second authenticator is illegal.

In step 2), the first authenticator acquires public authentication information of the security domain that the second authenticator belongs to, and verifies whether the identity authentication information of the second authenticator is valid according to the public authentication information; checks whether the identifier of the first authenticator is consistent with the identifier of the first authenticator included in the identity authentication information of the second authenticator; checks, in a case that the fifth identity authentication message includes the first time-varying parameter, whether the first time-varying parameter in the fourth identity authentication message is consistent with the first time-varying parameter included in the identity authentication information of the second authenticator; and if the identity authentication information of the second authenticator is valid, the identifier of the first authenticator is consistent with the identifier of the first authenticator included in the identity authentication information of the second authenticator, and the first time-varying parameter in the fourth identity authentication message is consistent with the first time-varying parameter included in the identity authentication information of the second authenticator, determines that the second authenticator is legal, otherwise determines that the first authenticator is illegal.

In the application, the first identity authentication message, the second identity authentication message, the third identity authentication message, the fourth identity authentication message, the fifth identity authentication message, the identity authentication information of the authentication server, the identity authentication information of the first authenticator, and the identity authentication information of the second authenticator further include optional fields, respectively.

Figure 1:
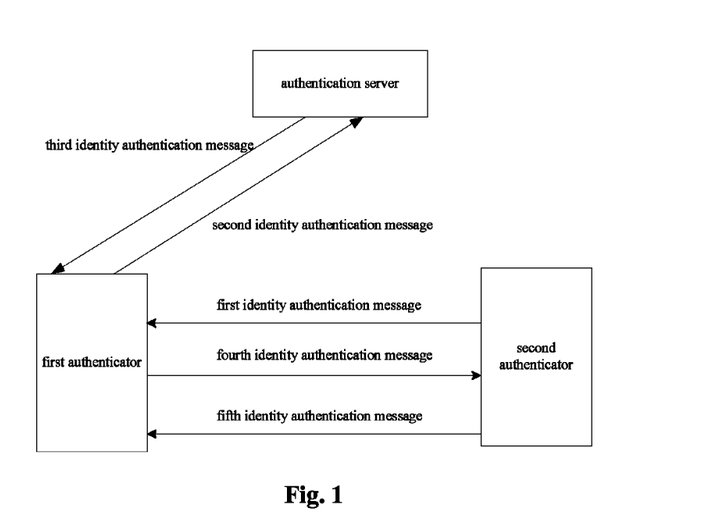
FIG. 1 is a flow chart of a method for identity authentication according to an embodiment of the application.
Figure 2:
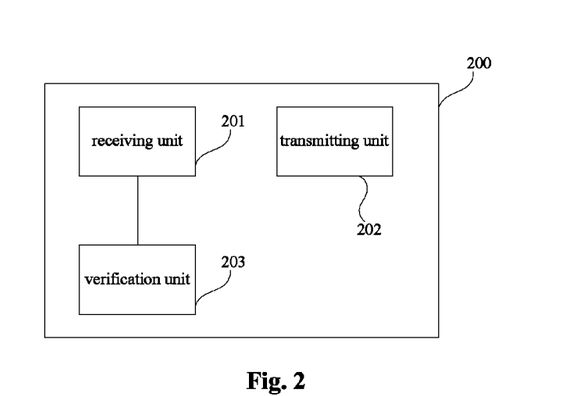
FIG. 2 is a structural diagram of a first authentication device according to an embodiment of the application.

A structural diagram of a first authentication device according to an embodiment of the application is shown in FIG. 2.

The first authentication device 200 includes a receiving unit 201, a transmitting unit 202, and a verification unit 203.

The receiving unit 201 is configured to receive a first identity authentication message sent by a second authentication device, where the first identity authentication message includes an identification of a security domain that the second authentication device belongs to.

The transmitting unit 202 is configured to transmit a second identity authentication message to an authentication server, where the second identity authentication message includes the identification of the security domain that the second authentication device belongs to and an identification of the first authentication device.

The receiving unit 201 is further configured to receive a third identity authentication message returned by the authentication server, where the third identity authentication message includes a verification result of the security domain that the second authentication device belongs to, a verification result of the first authentication device, and identity authentication information of the authentication server for information including the verification result of the security domain that the second authentication device belongs to and the verification result of the first authentication device.

The transmitting unit 202 is further configured to transmit a fourth identity authentication message to the second authentication device, where the fourth identity authentication message includes the identification of the first authentication device, the verification result of the first authentication device obtained by verifying the first authentication device by the authentication server, the identity authentication information of the authentication server, and identity authentication information of the first authentication device for information including the identifier of the security domain that the second authentication device belongs to.

The receiving unit 201 is further configured to receive a fifth identity authentication message sent by the second authentication device, where the fifth identity authentication message includes identity authentication information of the second authentication device for information including identifier of the first authentication device and the identifier of the security domain that the second authentication device belongs to.

The verification unit 203 is configured to verify legitimacy of the security domain that the second authentication device belongs to after receiving the fifth identity authentication message.

Figure 3:
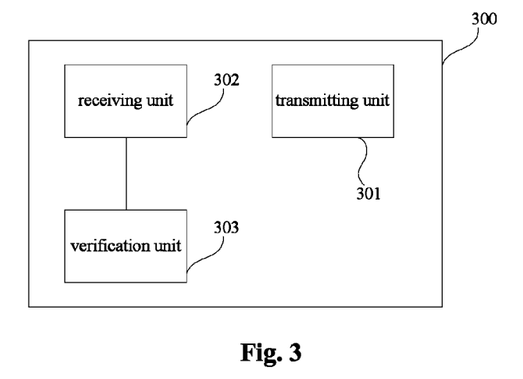
FIG. 3 is a structural diagram of a second authentication device according to an embodiment of the application.

A structural diagram of a second authentication device according to an embodiment of the application is shown in FIG. 3.

The second authentication device 300 includes a transmitting unit 301, a receiving unit 302, and a verification unit 303.

The transmitting unit 301 is configured to transmit a first identity authentication message to a first authentication device, where the first identity authentication message includes an identification of a security domain that the second authentication device belongs to.

The receiving unit 302 is configured to receive a fourth identity authentication message sent by the first authentication device, where the fourth identity authentication message includes the identification of the first authentication device, a verification result of the first authentication device obtained by verifying the first authentication device by the authentication server, identity authentication information of the authentication server, and identity authentication information of the first authentication device for information including the identifier of the security domain that the second authentication device belongs to.

The verification unit 303 is configured to perform verification on the fourth identity authentication message and determine legitimacy of identity of the first authentication device according to the verification, after receiving the fourth identity authentication message.

The transmitting unit 301 is further configured to transmit a fifth identity authentication message to the first authentication device, where the fifth identity authentication message includes identity authentication information of the second authentication device for information including the identifier of the first authentication device and the identifier of the security domain that the second authentication device belongs to.

Figure 4:
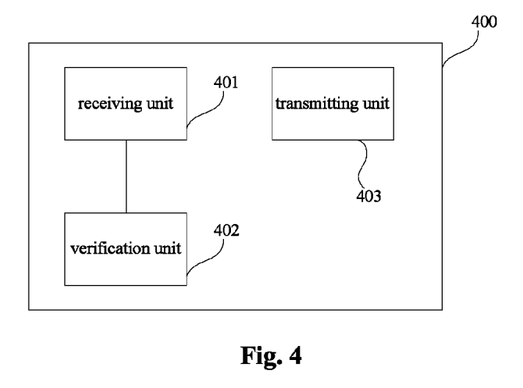
FIG. 4 is a structural diagram of an authentication server according to an embodiment of the application.

A structural diagram of an authentication server according to an embodiment of the application is shown in FIG. 4.

The authentication server 400 includes a receiving unit 401, a verification unit 402, and a transmitting unit 403.

The receiving unit 401 is configured to receive a second identity authentication message sent by a first authentication device, where the second identity authentication message includes an identification of a security domain that a second authentication device belongs to and an identification of the first authentication device.

The verification unit 402 is configured to verify legitimacy of the security domain that the second authentication device belongs to and legitimacy of the first authentication device according to the second identity authentication message, and generate a verification result of the security domain that the second authentication device belongs to and a verification result of the first authentication device.

The transmitting unit 403 is configured to return a third identity authentication message to the first authentication device, where the third identity authentication message includes the verification result of the security domain that the second authentication device belongs to, the verification result of the first authentication device, and identity authentication information of the authentication server for information including the verification result of the security domain that the second authentication device belongs to and the verification result of the first authentication device.

A preferable embodiment as follows is provided for a better understanding of the authentication method of the application.

A process of mutual identity authentication between the first authenticator and the second authenticator is implemented in the preferable embodiment, and the process includes following steps 1 to 8.

Step 1 includes: transmitting a first identity authentication message to a first authenticator by a second authenticator, where the first identity authentication message includes a second time-varying parameter generated by the second authenticator, an identification of a security domain that the second authenticator belongs to, and a first optional field.

Step 2 includes: transmitting a second identity authentication message to an authentication server by the first authenticator after the first authenticator receives the first identity authentication message, where the second identity authentication message includes a third time-varying parameter generated by the first authenticator, the second time-varying parameter generated by the second authenticator, the identification of the security domain that the second authenticator belongs to, an identification of the first authenticator and a second optional field.

Step 3 includes: verifying, by the authentication server, legitimacy of the security domain that the second authenticator belongs to and legitimacy of the first authenticator according to the identification of the security domain that the second authenticator belongs to and the identification of the first authenticator, after the authentication server receives the second identity authentication message.

The following way may be adopted for the authentication server to verifies legitimacy of the security domain that the second authenticator belongs to and legitimacy of the first authenticator.

In a case that the identification of the security domain that the second authenticator belongs to in the second identity authentication message is an identifier of the security domain that the second authenticator belongs to, the authentication server searches for valid public authentication information of the security domain that the second authenticator belongs to. In a case that the identification of the security domain that the second authenticator belongs to in the second identity authentication message is identity certification information of the security domain that the second authenticator belongs to, the authentication server verifies validity of the identity certification information of the security domain that the second authenticator belongs to. In a case that the identification of the first authenticator in the second identity authentication message is an identifier of the first authenticator, the authentication server searches for valid public authentication information of the first authenticator. In a case that the identification of the first authenticator in the second identity authentication message is identity certification information of the first authenticator, the authentication server verifies validity of the identity certification information of the first authenticator.

Step 4 includes: returning a third identity authentication message to the first authenticator by the authentication server after the authentication server verifies legitimacy of the security domain that the second authenticator belongs to and legitimacy of the first authenticator.

The third identity authentication message may be a message including a verification result of the security domain that the second authenticator belongs to obtained by verifying the security domain by the authentication server, a verification result of the first authenticator obtained by verifying the first authenticator by the authentication server, identity authentication information of the authentication server for information including the verification result of the security domain that the second authenticator belongs to, the third time-varying parameter and a fourth optional field, and identity authentication information of the authentication server for information including the verification result of the first authenticator, the second time-varying parameter and a fifth optional field.

The third identity authentication message may also be a message including a verification result of the security domain that the second authenticator belongs to obtained by verifying the security domain by the authentication server, a verification result of the first authenticator obtained by verifying the first authenticator by the authentication server, and identity authentication information of the authentication server for information including the verification result of the security domain that the second authenticator belongs to, the third time-varying parameter, the verification result of the first authenticator, the second time-varying parameter generated by the second authenticator and a sixth optional field.

Step 5 includes: transmitting a fourth identity authentication message to the second authenticator by the first authenticator after the first authenticator receives the third identity authentication message.

The fourth identity authentication message may include the identification of the first authenticator, the first time-varying parameter generated by the first authenticator, the verification result of the first authenticator obtained by verifying the first authenticator by the authentication server, identity authentication information of the authentication server for information including the verification result of the first authenticator, the second time-varying parameter and the fifth optional field, identity authentication information of the first authenticator for information including the first time-varying parameter, the second time-varying parameter, the identifier of the first authenticator, the identifier of the security domain that the second authenticator belongs to and a seventh optional field, and an eighth optional field.

The fourth identity authentication message also may be a message including the identification of the first authenticator, the first time-varying parameter generated by the first authenticator, the verification result of the first authenticator obtained by verifying the first authenticator by the authentication server, the verification result of the security domain that the second authenticator belongs to obtained by verifying the security domain by the authentication server, identity authentication information of the authentication server for information including the verification result of the security domain that the second authenticator belongs to, the third time-varying parameter, the verification result of the first authenticator, the second time-varying parameter and the sixth optional field, and a ninth optional field.

Step 6 includes: performing verification on the fourth identity authentication message by the second authenticator after the second authenticator receives the fourth identity authentication message. The process thereof is as following steps 6.1) to 6.3).

Step 6.1) includes: verifying, by the second authenticator, validity of the identity authentication information of the authentication server; checking, in a case that the identity authentication information of the authentication server includes the second time-varying parameter, whether the second time-varying parameter generated by the second authenticator in the first identity authentication message is consistent with the second time-varying parameter included in the identity authentication information of the authentication server; and if the identity authentication information of the authentication server is valid and the second time-varying parameter generated by the second authenticator in the first identity authentication message is consistent with the second time-varying parameter included in the identity authentication information of the authentication server, performing step 6.2), otherwise determining that the first authenticator is illegal.

Step 6.2) includes: if the second authenticator determines that the first authenticator is legal and valid according to the verification result of the first authenticator obtained by verifying the first authenticator by the authenticator server, performing step 6.3), otherwise determining that the first authenticator is illegal.

Step 6.3) includes: acquiring, by the second authenticator, public authentication information of the first authenticator, and verifying whether the identity authentication information of the first authenticator is valid according to the public authentication information; checking whether the identifier of the security domain that the second authenticator belongs to is consistent with the identifier of the security domain that the second authenticator belongs to included in the identity authentication information of the first authenticator; checking whether the second time-varying parameter generated by the second authenticator in the first identity authentication message is consistent with the second time-varying parameter included in the identity authentication information of the first authenticator; and if the identity authentication information of the first authenticator is valid, the identifier of the security domain that the second authenticator belongs to is consistent with the identifier of the security domain that the second authenticator belongs to included in the identity authentication information of the first authenticator, and the second time-varying parameter generated by the second authenticator in the first identity authentication message is consistent with the second time-varying parameter included in the identity authentication information of the first authenticator, determining that the first authenticator is legal and performing step 7, otherwise determining that the first authenticator is illegal.

Step 7 includes: transmitting a fifth identity authentication message to the first authenticator by the second authenticator, where the fifth identity authentication message includes the first time-varying parameter, the second time-varying parameter, identity authentication information of the second authenticator for information including the first time-varying parameter, the second time-varying parameter, the identifier of the first authenticator, the identifier of the security domain that the second authenticator belongs to and a tenth optional field, and an eleventh optional field.

Step 8 includes: verifying the fifth identity authentication message by the first authenticator after the first authenticator receives the fifth identity authentication message. The process thereof may be as following steps 8.1) to 8.3).

Step 8.1) includes: verifying, by the first authenticator, whether the identity authentication information of the authentication server for information including the verification result of the security domain that the second authenticator belongs to is valid according to the public authentication information of the authentication server; checking, in a case that the identity authentication information of the authentication server includes a third time-varying parameter, whether the third time-varying parameter generated by the first authenticator in the second identity authentication message is consistent with the third time-varying parameter included in the identity authentication information of the authentication server for information including the verification result of the security domain that the second authenticator belongs to; and if the identity authentication information of the authentication server for information including the verification result of the security domain that the second authenticator belongs to is valid and the third time-varying parameter generated by the first authenticator in the second identity authentication message is consistent with the third time-varying parameter included in the identity authentication information of the authentication server, performing step 8.2), otherwise determining that the security domain that the second authenticator belongs to is illegal.

Step 8.2) includes: obtaining, by the first authenticator, the verification result of the security domain that the second authenticator belongs to obtained by verifying the security domain by the authentication server; and if it is determined that the security domain that the second authenticator belongs to is legal and valid according to the verification result, performing step 8.3), otherwise determining that the security domain that the second authenticator belongs to is illegal.

Step 8.3) includes: acquiring, by the first authenticator, public authentication information of the security domain that the second authenticator belongs to, and verifying whether the identity authentication information of the second authenticator is valid according to the public authentication information; checking whether the identifier of the first authenticator is consistent with the identifier of the first authenticator included in the identity authentication information of the second authenticator; checking, in a case that the fifth identity authentication message includes a first time-varying parameter, whether the first time-varying parameter generated by the first authenticator in the fourth identity authentication message is consistent with the first time-varying parameter included in the identity authentication information of the second authenticator; and if the identity authentication information of the second authenticator is valid, the identifier of the first authenticator is consistent with the identifier of the first authenticator included in the identity authentication information of the second authenticator and the first time-varying parameter generated by the first authenticator in the fourth identity authentication message is consistent with the first time-varying parameter included in the identity authentication information of the second authenticator, determining that the second authenticator is legal, otherwise determining that the first authenticator is illegal. In this case, the authentication of the second authenticator by the first authenticator is finished.

The foregoing step 8.1) may be performed in the foregoing step 5, i.e., the "verifying whether the identity authentication information of the authentication server for information including the verification result of the security domain that the second authenticator belongs to is valid according to the public authentication information of the authentication server, and checking, in a case that the identity authentication information of the authentication server includes a third time-varying parameter, whether the third time-varying parameter generated by the first authenticator in the second identity authentication message is consistent with the third time-varying parameter included in the identity authentication information of the authentication server for information including the verification result of the security domain that the second authenticator belongs to" in the step 8.1) is performed by the first authenticator in the step 5 after the first authenticator receives the third identity authentication message and before the first authenticator transmits the fourth identity authentication message to the second authenticator, then the first authenticator transmits the fourth identity authentication message to the second authenticator if the identity authentication information of the authentication server for information including the verification result of the security domain that the second authenticator belongs to is valid and the third time-varying parameter generated by the first authenticator in the second identity authentication message is consistent with the third time-varying parameter included in the identity authentication information of the authentication server for information including the verification result of the security domain that the second authenticator belongs to. The execution of step 8 starts from step 8.2).

By the foregoing mutual authentication between the second authenticator and the first authenticator, mutual authentication of legitimacy of identities between two entities can be achieved, and identity information of the second authenticator is protected from exposure.

Existence and contents of the terms "first optional field", "second optional field", "third optional field" and so on hereinbefore are uncertain. The main aim thereof is that implementers can define optional text contents according to practical needs to achieve expansion. Therefore, the optional texts may also be omitted in other embodiments.

The previously mentioned private authentication information of the first authenticator may be information such as a private key in a public key cryptosytem in the field of information security.

The previously mentioned private authentication information of the second authenticator may be information such as an anonymous signing key in a public key cryptosytem in the field of information security.

The previously mentioned identity authentication information of the first authenticator or of the authentication server may be information generated by calculation using private authentication information and information security technology such as digital signature.

The previously mentioned identity authentication information of the second authenticator may be information generated by calculation using private authentication information and information security technology such as digital signature.

The previously mentioned first time-varying parameter and third time-varying parameter are both time-varying parameters generated by the first authenticator, and these two time-varying parameters may be same or different.

The purpose, the technical solutions and the advantage of this application are described in detail by the foregoing embodiments. It should be understood that the above-described is merely embodiments of the application, and is not to limit the scope of the application. Any modification, equivalent substitution or improvement within the spirit and principles of the application should be contained within the scope of the application.

The invention claimed is:
1. An authentication method, applied to an authentication system comprising a first authenticator, a second authenticator, a security domain that the second authenticator belongs to, and an authentication server;
wherein entities of the security domain that the second authenticator belongs to share a piece of public authentication information, and each of the entities of the security domain has its own private authentication information;

wherein the method comprises following steps 1 to 8:
step 1 comprising: transmitting a first identity authentication message to the first authenticator by the second authenticator, wherein the first identity authentication message comprises an identification of the security domain that the second authenticator belongs to;
step 2 comprising: transmitting a second identity authentication message to the authentication server by the first authenticator, wherein the second identity authentication message comprises the identification of the security domain that the second authenticator belongs to and an identification of the first authenticator;
step 3 comprising: verifying, by the authentication server, legitimacy of the security domain that the second authenticator belongs to and legitimacy of the first authenticator according to the second identity authentication message, and generating a verification result of the security domain that the second authenticator belongs to and a verification result of the first authenticator, after the authentication server receives the second identity authentication message;
step 4 comprising: returning a third identity authentication message to the first authenticator by the authentication server, wherein the third identity authentication message comprises the verification result of the security domain that the second authenticator belongs to, the verification result of the first authenticator, and identity authentication information of the authentication server for information comprising the verification result of the security domain that the second authenticator belongs to and the verification result of the first authenticator;
step 5 comprising: transmitting a fourth identity authentication message to the second authenticator by the first authenticator after the first authenticator receives the third identity authentication message, wherein the fourth identity authentication message comprises the identification of the first authenticator, the verification result of the first authenticator obtained by verifying the first authenticator by the authentication server, the identity authentication information of the authentication server, and identity authentication information of the first authenticator for information comprising the identifier of the security domain that the second authenticator belongs to;
step 6 comprising: performing, by the second authenticator, verification on the fourth identity authentication message and determining, by the second authenticator, legitimacy of identity of the first authenticator according to the verification, after the second authenticator receives the fourth identity authentication message;
step 7 comprising: transmitting a fifth identity authentication message to the first authenticator by the second authenticator, wherein the fifth identity authentication message comprises identity authentication information of the second authenticator for information comprising the identifier of the first authenticator and the identifier of the security domain that the second authenticator belongs to, wherein the fifth identity authentication message is generated using private authentication information of the second authenticator; and
step 8 comprising: verifying, by the first authenticator, legitimacy of the security domain that the second authenticator belongs to after the first authenticator receives the fifth identity authentication message.

2. The authentication method according to claim 1, wherein
the first identity authentication message further comprises a second time-varying parameter generated by the second authenticator;
the second identity authentication message further comprises the second time-varying parameter and a third time-varying parameter, wherein the third time-varying parameter is generated by the first authenticator;
the identity authentication information of the authentication server for information comprising the verification result of the security domain that the second authenticator belongs to in the third identity authentication message further comprises the third time-varying parameter, and the identity authentication information of the authentication server for information comprising the verification result of the first authenticator in the third identity authentication message further comprises the second time-varying parameter;
the fourth identity authentication message further comprises a first time-varying parameter generated by the first authenticator, and the identity authentication information of the first authenticator further comprises the first time-varying parameter and the second time-varying parameter; and
the fifth identity authentication message further comprises the first time-varying parameter and the second time-varying parameter.

3. The authentication method according to claim 2, wherein
the performing, by the second authenticator, verification on the fourth identity authentication message and determining, by the second authenticator, legitimacy of the first authenticator according to the verification in the step 6 further comprises:
6.1) verifying, by the second authenticator, validity of the identity authentication information of the authentication server; checking, in a case that the identity authentication information of the authentication server comprises a second time-varying parameter, whether the second time-varying parameter generated by the second authenticator in the first identity authentication message is consistent with the second time-varying parameter comprised in the identity authentication information of the authentication server; and if the identity authentication information of the authentication server is valid and the second time-varying parameter generated by the second authenticator in the first identity authentication message is consistent with the second time-varying parameter comprised in the identity authentication information of the authentication server, performing step 6.2), otherwise determining that the first authenticator is illegal;
6.2) if the second authenticator determines that the first authenticator is legal and valid according to the verification result of the first authenticator obtained by verifying the first authenticator by the authenticator server, performing step 6.3), otherwise determining that the first authenticator is illegal; and
6.3) acquiring, by the second authenticator, public authentication information of the first authenticator, and verifying whether the identity authentication information of the first authenticator is valid according to the public authentication information; checking whether the identifier of the security domain that the second authenticator belongs to is consistent with the identifier of the security domain that the second authenticator belongs to comprised in the identity authentication information of the first authenticator; checking, in a case that the identity authentication information of the first authenticator comprises a second time-varying parameter, whether the second time-varying parameter generated by the second authenticator in the first identity authentication message is consistent with the second time-varying parameter comprised in the identity authentication information of the first authenticator; and if the identity authentication information of the first authenticator is valid, the identifier of the security domain that the second authenticator belongs to is consistent with the identifier of the security domain that the second authenticator belongs to comprised in the identity authentication information of the first authenticator, and the second time-varying parameter generated by the second authenticator in the first identity authentication message is consistent with the second time-varying parameter comprised in the identity authentication information of the first authenticator, determining that the first authenticator is legal, otherwise determining that the first authenticator is illegal.

4. The authentication method according to claim 2, wherein the verifying, by the first authenticator, legitimacy of the security domain that the second authenticator belongs to after the first authenticator receives the fifth identity authentication message in the step 8 further comprises:

8.1) verifying, by the first authenticator, whether the identity authentication information of the authentication server for information comprising the verification result of the security domain that the second authenticator belongs to is valid; checking, in a case that the identity authentication information of the authentication server comprises a third time-varying parameter, whether the third time-varying parameter generated by the first authenticator in the second identity authentication message is consistent with the third time-varying parameter comprised in the identity authentication information of the authentication server; and if the third time-varying parameter generated by the first authenticator in the second identity authentication message is consistent with the third time-varying parameter comprised in the identity authentication information of the authentication server, performing step 8.2), otherwise determining that the second authenticator is illegal;

8.2) if the first authenticator determines that the second authenticator is legal and valid according to the verification result of the second authenticator obtained by verifying the second authenticator by the authentication server, performing step 8.3), otherwise determining that the second authenticator is illegal; and 8.3) acquiring, by the first authenticator, public authentication information of the security domain that the second authenticator belongs to, and verifying whether the identity authentication information of the second authenticator is valid according to the public authentication information; checking whether the identifier of the first authenticator is consistent with the identifier of the first authenticator comprised in the identity authentication information of the second authenticator; checking, in a case that the fifth identity authentication message comprises a first time-varying parameter, whether the first time-varying parameter in the fourth identity authentication message is consistent with the first time-varying parameter comprised in the identity authentication information of the second authenticator; and if the identity authentication information of the second authenticator is valid, the identifier of the first authenticator is consistent with the identifier of the first authenticator comprised in the identity authentication information of the second authenticator, and the first time-varying parameter in the fourth identity authentication message is consistent with the first time-varying parameter comprised in the identity authentication information of the second authenticator, determining that the second authenticator is legal, otherwise determining that the first authenticator is illegal.

5. The authentication method according to claim 2, wherein before the first authenticator transmits the fourth identity authentication message to the second authenticator, the first authenticator verifies whether the identity authentication information of the authentication server for information comprising the verification result of the security domain that the second authenticator belongs to is valid, checks, in a case that the identity authentication information of the authentication server comprises a third time-varying parameter, whether the third time-varying parameter generated by the first authenticator in the second identity authentication message is consistent with the third time-varying parameter comprised in the identity authentication information of the authentication server, and transmits the fourth identity authentication message to the second authenticator if the identity authentication information of the authentication server for information comprising the verification result of the security domain that the second authenticator belongs to is valid, and the third time-varying parameter generated by the first authenticator in the second identity authentication message is consistent with the third time-varying parameter comprised in the identity authentication information of the authentication server;

the verifying, by the first authenticator, legitimacy of the security domain that the second authenticator belongs to after the first authenticator receives the fifth identity authentication message in the step 8 further comprises:

8.1) if the first authenticator determines that the security domain that the second authenticator belongs to is legal and valid according to the verification result of the security domain that the second authenticator belongs to obtained by verifying the security domain by the authentication server, performing step 8.2), otherwise determining that the second authenticator is illegal; and 8.2) acquiring, by the first authenticator, public authentication information of the security domain that the second authenticator belongs to, and verifying whether the identity authentication information of the second authenticator is valid according to the public authentication information; checking whether the identifier of the first authenticator is consistent with the identifier of the first authenticator comprised in the identity authentication information of the second authenticator; checking, in a case that the fifth identity authentication message comprises a first time-varying parameter, whether the first time-varying parameter in the fourth identity authentication message is consistent with the first time-varying parameter comprised in the identity authentication information of the second authenticator; and if the identity authentication information of the second authenticator is valid, the identifier of the first authenticator is consistent with the identifier of the first authenticator comprised in the identity authentication information of the second authenticator, and the first time-varying parameter in the fourth identity authentication message is consistent with the first time-varying parameter comprised in the identity authentication information of the second authenticator, determining that the second authenticator is legal, otherwise determining that the first authenticator is illegal.

6. The authentication method according to claim 1, wherein the checking, by the authentication server, legitimacy of the security domain that the second authenticator belongs to according to the second identity authentication message in the step 3 further comprises:

in a case that the identification of the security domain that the second authenticator belongs to in the second identity authentication message is an identifier of the security domain that the second authenticator belongs to, the authentication server searches for public authentication information of the security domain that the second authenticator belongs to, determines that the security domain that the second authenticator belongs to is legal if the public authentication information is found, and determines that the security domain that the second authenticator belongs to is illegal if the public authentication information is not found; or in a case that the identification of the security domain that the second authenticator belongs to in the second identity authentication message is identity certification information of the security domain that the second authenticator belongs to, the authentication server verifies validity of the identity certification information, determines that the security domain that the second authenticator belongs to is legal if the identity certification information is valid, and determines that the security domain that the second authenticator belongs to is illegal if the identity certification information is invalid.

7. The authentication method according to claim 6, wherein the performing, by the second authenticator, verification on the fourth identity authentication message and determining, by the second authenticator, legitimacy of the first authenticator according to the verification in the step 6 further comprises:

6.1) verifying, by the second authenticator, validity of the identity authentication information of the authentication server; checking, in a case that the identity authentication information of the authentication server comprises a second time-varying parameter, whether the second time-varying parameter generated by the second authenticator in the first identity authentication message is consistent with the second time-varying parameter comprised in the identity authentication information of the authentication server; and if the identity authentication information of the authentication server is valid and the second time-varying parameter generated by the second authenticator in the first identity authentication message is consistent with the second time-varying parameter comprised in the identity authentication information of the authentication server, performing step 6.2), otherwise determining that the first authenticator is illegal;

6.2) if the second authenticator determines that the first authenticator is legal and valid according to the verification result of the first authenticator obtained by verifying the first authenticator by the authentication server, performing step 6.3), otherwise determining that the first authenticator is illegal; and 6.3) acquiring, by the second authenticator, public authentication information of the first authenticator, and verifying whether the identity authentication information of the first authenticator is valid according to the public authentication information; checking whether the identifier of the security domain that the second authenticator belongs to is consistent with the identifier of the security domain that the second authenticator belongs to comprised in the identity authentication information of the first authenticator; checking, in a case that the identity authentication information of the first authenticator comprises a second time-varying parameter, whether the second time-varying parameter generated by the second authenticator in the first identity authentication message is consistent with the second time-varying parameter comprised in the identity authentication information of the first authenticator; and if the identity authentication information of the first authenticator is valid, the identifier of the security domain that the second authenticator belongs to is consistent with the identifier of the security domain that the second authenticator belongs to comprised in the identity authentication information of the first authenticator, and the second time-varying parameter generated by the second authenticator in the first identity authentication message is consistent with the second time-varying parameter comprised in the identity authentication information of the first authenticator, determining that the first authenticator is legal, otherwise determining that the first authenticator is illegal.

8. The authentication method according to claim 6, wherein the verifying, by the first authenticator, legitimacy of the security domain that the second authenticator belongs to after the first authenticator receives the fifth identity authentication message in the step 8 further comprises:

8.1) verifying, by the first authenticator, whether the identity authentication information of the authentication server for information comprising the verification result of the security domain that the second authenticator belongs to is valid; checking, in a case that the identity authentication information of the authentication server comprises a third time-varying parameter, whether the third time-varying parameter generated by the first authenticator in the second identity authentication message is consistent with the third time-varying parameter comprised in the identity authentication information of the authentication server; and if the third time-varying parameter generated by the first authenticator in the second identity authentication message is consistent with the third time-varying parameter comprised in the identity authentication information of the authentication server, performing step 8.2), otherwise determining that the second authenticator is illegal;

8.2) if the first authenticator determines that the second authenticator is legal and valid according to the verification result of the second authenticator obtained by verifying the second authenticator by the authentication server, performing step 8.3), otherwise determining that the second authenticator is illegal; and 8.3) acquiring, by the first authenticator, public authentication information of the security domain that the second authenticator belongs to, and verifying whether the identity authentication information of the second authenticator is valid according to the public authentication information; checking whether the identifier of the first authenticator is consistent with the identifier of the first authenticator comprised in the identity authentication information of the second authenticator; checking, in a case that the fifth identity authentication message comprises a first time-varying parameter, whether the first time-varying parameter in the fourth identity authentication message is consistent with the first time-varying parameter comprised in the identity authentication information of the second authenticator; and if the identity authentication information of the second authenticator is valid, the identifier of the first authenticator is consistent with the identifier of the first authenticator comprised in the identity authentication information of the second authenticator, and the first time-varying parameter in the fourth identity authentication message is consistent with the first time-varying parameter comprised in the identity authentication information of the second authenticator, determining that the second authenticator is legal, otherwise determining that the first authenticator is illegal.

9. The authentication method according to claim 6, wherein
before the first authenticator transmits the fourth identity authentication message to the second authenticator, the first authenticator verifies whether the identity authentication information of the authentication server for information comprising the verification result of the security domain that the second authenticator belongs to is valid, checks, in a case that the identity authentication information of the authentication server comprises a third time-varying parameter, whether the third time-varying parameter generated by the first authenticator in the second identity authentication message is consistent with the third time-varying parameter comprised in the identity authentication information of the authentication server, and transmits the fourth identity authentication message to the second authenticator if the identity authentication information of the authentication server for information comprising the verification result of the security domain that the second authenticator belongs to is valid, and the third time-varying parameter generated by the first authenticator in the second identity authentication message is consistent with the third time-varying parameter comprised in the identity authentication information of the authentication server;
the verifying, by the first authenticator, legitimacy of the security domain that the second authenticator belongs to after the first authenticator receives the fifth identity authentication message in the step 8 further comprises:
8.1) if the first authenticator determines that the security domain that the second authenticator belongs to is legal and valid according to the verification result of the security domain that the second authenticator belongs to obtained by verifying the security domain by the authentication server, performing step 8.2), otherwise determining that the second authenticator is illegal; and
8.2) acquiring, by the first authenticator, public authentication information of the security domain that the second authenticator belongs to, and verifying whether the identity authentication information of the second authenticator is valid according to the public authentication information; checking whether the identifier of the first authenticator is consistent with the identifier of the first authenticator comprised in the identity authentication information of the second authenticator; checking, in a case that the fifth identity authentication message comprises a first time-varying parameter, whether the first time-varying parameter in the fourth identity authentication message is consistent with the first time-varying parameter comprised in the identity authentication information of the second authenticator; and if the identity authentication information of the second authenticator is valid, the identifier of the first authenticator is consistent with the identifier of the first authenticator comprised in the identity authentication information of the second authenticator, and the first time-varying parameter in the fourth identity authentication message is consistent with the first time-varying parameter comprised in the identity authentication information of the second authenticator, determining that the second authenticator is legal, otherwise determining that the first authenticator is illegal.

10. The authentication method according to claim 1, wherein
the verifying, by the authentication server, legitimacy of the first authenticator according to the second identity authentication message in the step 3 further comprises:
in a case that the identification of the first authenticator in the second identity authentication message is an identifier of the first authenticator, the authentication server searches for public authentication information of the first authenticator, determines that the first authenticator is legal if the public authentication information is found, and determines that the first authenticator is illegal if the public authentication information is not found; or
in a case that the identification of the first authenticator in the second identity authentication message is identity certification information of the first authenticator, the authentication server verifies validity of the identity certification information, determines that the first authenticator is legal if the identity certification information is valid, and determines that the first authenticator is illegal if the identity certification information is invalid.

11. The authentication method according to claim 10, wherein
the performing, by the second authenticator, verification on the fourth identity authentication message and determining, by the second authenticator, legitimacy of the first authenticator according to the verification in the step 6 further comprises:
6.1) verifying, by the second authenticator, validity of the identity authentication information of the authentication server; checking, in a case that the identity authentication information of the authentication server comprises a second time-varying parameter, whether the second time-varying parameter generated by the second authenticator in the first identity authentication message is consistent with the second time-varying parameter comprised in the identity authentication information of the authentication server; and if the identity authentication information of the authentication server is valid and the second time-varying parameter generated by the second authenticator in the first identity authentication message is consistent with the second time-varying parameter comprised in the identity authentication information of the authentication server, performing step 6.2), otherwise determining that the first authenticator is illegal;
6.2) if the second authenticator determines that the first authenticator is legal and valid according to the verification result of the first authenticator obtained by verifying the first authenticator by the authenticator server, performing step 6.3), otherwise determining that the first authenticator is illegal; and 6.3) acquiring, by the second authenticator, public authentication information of the first authenticator, and verifying whether the identity authentication information of the first authenticator is valid according to the public authentication information; checking whether the identifier of the security domain that the second authenticator belongs to is consistent with the identifier of the security domain that the second authenticator belongs to comprised in the identity authentication information of the first authenticator; checking, in a case that the identity authentication information of the first authenticator comprises a second time-varying parameter, whether the second time-varying parameter generated by the second authenticator in the first identity authentication message is consistent with the second time-varying parameter comprised in the identity authentication information of the first authenticator; and if the identity authentication information of the first authenticator is valid, the identifier of the security domain that the second authenticator belongs to is consistent with the identifier of the security domain that the second authenticator belongs to comprised in the identity authentication information of the first authenticator, and the second time-varying parameter generated by the second authenticator in the first identity authentication message is consistent with the second time-varying parameter comprised in the identity authentication information of the first authenticator, determining that the first authenticator is legal, otherwise determining that the first authenticator is illegal.

12. The authentication method according to claim 1, wherein
the performing, by the second authenticator, verification on the fourth identity authentication message and determining, by the second authenticator, legitimacy of the first authenticator according to the verification in the step 7 further comprises:
6.1) verifying, by the second authenticator, validity of the identity authentication information of the authentication server; checking, in a case that the identity authentication information of the authentication server comprises a second time-varying parameter, whether the second time-varying parameter generated by the second authenticator in the first identity authentication message is consistent with the second time-varying parameter comprised in the identity authentication information of the authentication server; and if the identity authentication information of the authentication server is valid and the second time-varying parameter generated by the second authenticator in the first identity authentication message is consistent with the second time-varying parameter comprised in the identity authentication information of the authentication server, performing step 6.2), otherwise determining that the first authenticator is illegal;
6.2) if the second authenticator determines that the first authenticator is legal and valid according to the verification result of the first authenticator obtained by verifying the first authenticator by the authenticator server, performing step 6.3), otherwise determining that the first authenticator is illegal; and
6.3) acquiring, by the second authenticator, public authentication information of the first authenticator, and verifying whether the identity authentication information of the first authenticator is valid according to the public authentication information; checking whether the identifier of the security domain that the second authenticator belongs to is consistent with the identifier of the security domain that the second authenticator belongs to comprised in the identity authentication information of the first authenticator; checking, in a case that the identity authentication information of the first authenticator comprises a second time-varying parameter, whether the second time-varying parameter generated by the second authenticator in the first identity authentication message is consistent with the second time-varying parameter comprised in the identity authentication information of the first authenticator; and if the identity authentication information of the first authenticator is valid, the identifier of the security domain that the second authenticator belongs to is consistent with the identifier of the security domain that the second authenticator belongs to comprised in the identity authentication information of the first authenticator, and the second time-varying parameter generated by the second authenticator in the first identity authentication message is consistent with the second time-varying parameter comprised in the identity authentication information of the first authenticator, determining that the first authenticator is legal, otherwise determining that the first authenticator is illegal.

13. The authentication method according to claim 1, wherein
the verifying, by the first authenticator, legitimacy of the security domain that the second authenticator belongs to after the first authenticator receives the fifth identity authentication message in the step 8 further comprises:
8.1) verifying, by the first authenticator, whether the identity authentication information of the authentication server for information comprising the verification result of the security domain that the second authenticator belongs to is valid; checking, in a case that the identity authentication information of the authentication server comprises a third time-varying parameter, whether the third time-varying parameter generated by the first authenticator in the second identity authentication message is consistent with the third time-varying parameter comprised in the identity authentication information of the authentication server; and if the third time-varying parameter generated by the first authenticator in the second identity authentication message is consistent with the third time-varying parameter comprised in the identity authentication information of the authentication server, performing step 8.2), otherwise determining that the second authenticator is illegal;
8.2) if the first authenticator determines that the second authenticator is legal and valid according to the verification result of the second authenticator obtained by verifying the second authenticator by the authentication server, performing step 8.3), otherwise determining that the second authenticator is illegal; and
8.3) acquiring, by the first authenticator, public authentication information of the security domain that the second authenticator belongs to, and verifying whether the identity authentication information of the second authenticator is valid according to the public authentication information; checking whether the identifier of the first authenticator is consistent with the identifier of the first authenticator comprised in the identity authentication information of the second authenticator; checking, in a case that the fifth identity authentication message comprises a first time-varying parameter, whether the first time-varying parameter in the fourth identity authentication message is consistent with the first time-varying parameter comprised in the identity authentication information of the second authenticator; and if the identity authentication information of the second authenticator is valid, the identifier of the first authenticator is consistent with the identifier of the first authenticator comprised in the identity authentication information of the second authenticator, and the first time-varying parameter in the fourth identity authentication message is consistent with the first time-varying parameter comprised in the identity authentication information of the second authenticator, determining that the second authenticator is legal, otherwise determining that the first authenticator is illegal.

14. The authentication method according to claim 1, wherein before the first authenticator transmits the fourth identity authentication message to the second authenticator, the first authenticator verifies whether the identity authentication information of the authentication server for information comprising the verification result of the security domain that the second authenticator belongs to is valid, checks, in a case that the identity authentication information of the authentication server comprises a third time-varying parameter, whether the third time-varying parameter generated by the first authenticator in the second identity authentication message is consistent with the third time-varying parameter comprised in the identity authentication information of the authentication server, and transmits the fourth identity authentication message to the second authenticator if the identity authentication information of the authentication server for information comprising the verification result of the security domain that the second authenticator belongs to is valid, and the third time-varying parameter generated by the first authenticator in the second identity authentication message is consistent with the third time-varying parameter comprised in the identity authentication information of the authentication server;

the verifying, by the first authenticator, legitimacy of the security domain that the second authenticator belongs to after the first authenticator receives the fifth identity authentication message in the step 8 further comprises:

8.1) if the first authenticator determines that the security domain that the second authenticator belongs to is legal and valid according to the verification result of the security domain that the second authenticator belongs to obtained by verifying the security domain by the authentication server, performing step 8.2), otherwise determining that the second authenticator is illegal; and 8.2) acquiring, by the first authenticator, public authentication information of the security domain that the second authenticator belongs to, and verifying whether the identity authentication information of the second authenticator is valid according to the public authentication information; checking whether the identifier of the first authenticator is consistent with the identifier of the first authenticator comprised in the identity authentication information of the second authenticator; checking, in a case that the fifth identity authentication message comprises a first time-varying parameter, whether the first time-varying parameter in the fourth identity authentication message is consistent with the first time-varying parameter comprised in the identity authentication information of the second authenticator; and if the identity authentication information of the second authenticator is valid, the identifier of the first authenticator is consistent with the identifier of the first authenticator comprised in the identity authentication information of the second authenticator, and the first time-varying parameter in the fourth identity authentication message is consistent with the first time-varying parameter comprised in the identity authentication information of the second authenticator, determining that the second authenticator is legal, otherwise determining that the first authenticator is illegal.

15. A first authentication device comprised in an authentication system, wherein the authentication system further comprises a second authentication device, a security domain that the second authentication device belongs to, and an authentication server;

wherein entities of the security domain that the second authentication device belongs to share a piece of public authentication information, and each of the entities of the security domain has its own private authentication information;

wherein the first authentication device comprises:

a receiving unit, a transmitting unit, and a verification unit; wherein the receiving unit is configured to receive a first identity authentication message sent by the second authentication device, wherein the first identity authentication message comprises an identification of the security domain that the second authentication device belongs to;

the transmitting unit is configured to transmit a second identity authentication message to the authentication server, wherein the second identity authentication message comprises the identification of the security domain that the second authentication device belongs to and an identification of the first authentication device;

the receiving unit is further configured to receive a third identity authentication message returned by the authentication server, wherein the third identity authentication message comprises a verification result of the security domain that the second authentication device belongs to, a verification result of the first authentication device, and identity authentication information of the authentication server for information comprising the verification result of the security domain that the second authentication device belongs to and the verification result of the first authentication device;

the transmitting unit is further configured to transmit a fourth identity authentication message to the second authentication device, wherein the fourth identity authentication message comprises the identification of the first authentication device, the verification result of the first authentication device obtained by verifying the first authentication device by the authentication server, the identity authentication information of the authentication server, and identity authentication information of the first authentication device for information comprising the identifier of the security domain that the second authentication device belongs to;

the receiving unit is further configured to receive a fifth identity authentication message sent by the second authentication device, wherein the fifth identity authentication message comprises identity authentication information of the second authentication device for information comprising the identifier of the first authentication device and the identifier of the security domain that the second authentication device belongs to, wherein the fifth identity authentication message is generated using private authentication information of the second authentication device; and the verification unit is configured to verify legitimacy of the security domain that the second authentication device belongs to after receiving the fifth identity authentication message.

16. A second authentication device comprised in an authentication system, wherein the authentication system further comprises a first authentication device, a security domain that the second authentication device belongs to, and an authentication server;

wherein entities of the security domain that the second authentication device belongs to share a piece of public authentication information, and each of the entities of the security domain has its own private authentication information;

wherein the second authentication device comprises:

a transmitting unit, a receiving unit, and a verification unit; wherein the transmitting unit is configured to transmit a first identity authentication message to the first authentication device, wherein the first identity authentication message comprises an identification of the security domain that the second authentication device belongs to;

the receiving unit is configured to receive a fourth identity authentication message sent by the first authentication device, wherein the fourth identity authentication message comprises an identification of the first authentication device, a verification result of the first authentication device obtained by verifying the first authentication device by the authentication server, identity authentication information of the authentication server, and identity authentication information of the first authentication device for information comprising the identifier of the security domain that the second authentication device belongs to;

the verification unit is configured to perform verification on the fourth identity authentication message and determine legitimacy of identity of the first authentication device according to the verification, after receiving the fourth identity authentication message; and the transmitting unit is further configured to transmit a fifth identity authentication message to the first authentication device, wherein the fifth identity authentication message comprises identity authentication information of the second authentication device for information comprising the identifier of the first authentication device and the identifier of the security domain that the second authentication device belongs to, and the fifth identify authentication message is generated using private authentication information of the second authentication device.

* * * * *